Aug. 17, 1965 C. S. HERRICK 3,201,275

METHOD AND APPARATUS FOR MENISCUS COATING

Filed Dec. 21, 1961 2 Sheets-Sheet 1

Inventor:
Carlyle S. Herrick,
by James J. Lichiello
His Attorney.

Aug. 17, 1965 C. S. HERRICK 3,201,275

METHOD AND APPARATUS FOR MENISCUS COATING

Filed Dec. 21, 1961 2 Sheets-Sheet 2

Inventor:
Carlyle S. Herrick, by James J. Lichiello

His Attorney.

United States Patent Office 3,201,275
Patented Aug. 17, 1965

3,201,275
METHOD AND APPARATUS FOR MENISCUS COATING

Carlyle S. Herrick, Alplaus, N.Y., assignor to General Electric Company, a corporation of New York Filed Dec. 21, 1961, Ser. No. 161,003
9 Claims. (Cl. 117—213)

This invention relates to a coating method and apparatus and more particularly to a coating method and apparatus as utilized in conjunction with the preparation of specific information recording articles or mediums, such as for example, tapes, sheets, discs, etc., which are suitable for the recording, storing and reproduction of photographic images and technical data, etc.

A descriptive term applied to one of such articles is "thermoplastic tape." A thermoplastic tape usually includes a three-part structure consisting of a base or supporting member, an electrically conducting layer superimposed thereon and a layer of thermoplastic dielectric on the electrically conducting layer. Information placed on the dielectric surface in the form of an electrical charge pattern is made visible by heating the thermoplastic dielectric above its softening point. The electric charges on the dielectric surface cause the dielectric to flow and form a visible image of the charged pattern. When the thermoplastic dielectric is cooled the image is immobilized. The image is then viewed by transmitted light optics or by reflected light optics. For use with transmitted light, the tape must be transparent. For use with the reflected light, the tape may be transparent or opaque. The image developing temperature must be below that temperature which causes significant dimensional distortion of the supporting member. Additionally, thermoplastic tape for example must have sufficient flexibility for guiding over rollers to lead it through various processes, for winding on reels, and for passing through projectors to view the developed image. A further description of methods and apparatus for recording information as described above may be found in copending applications Serial Nos. 698,167 and 783,584, both now abandoned, Glenn, filed November 22, 1957, and December 29, 1958, respectively, and assigned to the same assignee as the present invention.

A thermoplastic tape may be coated with an electrically conducting layer by various means known in the art. The electrically conducting coating should be mechanically adherent to the supporting member, optically and electrically uniform, and stable for commercially useful periods of time. On thermoplastic tape intended to be read by reflection optics, it may be thick enough to be opaque, and on tape intended to be read by transmission optics it must have certain transparency, with the exact degree playing an important part in determining the efficiency of the optical system. Coatings of metals, metal oxides, metal sulfides, metal iodides, conducting nonmetals, and semiconductors may be used. Coatings of materials such as silver, gold, platinum, tin, carbon, copper, nickel, chromium, silicon, indium, indium oxide, copper oxide, tin oxide, copper iodide, copper sulfide can be applied in thicknesses such that they are both electrically conducting and optically transmitting. Methods and apparatus utilized in coating a supporting member are well known in the art and include, for example thermal and electrical evaporation or condensation. One method of applying a metal salt conducting layer to a support member, e.g., Plexiglas, is found in U.S. Patent 2,756,165, Lyon.

After the metallic conducting layer is applied to the backing member, a solution of a suitable thermoplastic composition is applied to the surface of the conducting layer and the solvent evaporated for deposition of a thin film of thermoplastic composition on the conducting layer.

Thermoplastic composition coating methods include for example, the well known roll coating and meniscus coating. The term "meniscus" is defined as the curved upper surface of a liquid column which is concave when the containing walls of a column are wet by the liquid, and convex when not. Meniscus coating has been previously employed in the art and, in thermoplastic tape coating, includes the creation of a meniscus between a supporting body and a moving tape. Such a meniscus may be created between a roller member, in rolling contact with a liquid solution and a moving tape, i.e., the roll method. Alternately, a meniscus may be generated between a feed nozzle, connected to a source of solution supply, and a moving tape. The various teachings of ways and means to provide the particular meniscus coating are therefore part of the prior art knowledge.

Considering coatings of 3 to 8 microns in thickness, the roll method of applying such a coating with the desired smoothness has certain disadvantages relating to the difficulties of the roller taking up and delivering a uniform supply to the meniscus. This is especially true where evaporation, density, viscosity, and other solution conditions are not maintained precisely constant. Furthermore, the nature of the film is not smooth or uniform on the take up roll and this condition exists after transfer of the coating material to the tape.

One of the most salient problems associated with the nozzle method of meniscus coating relates to the feed system for the coating solution from the reservoir or source of supply to the meniscus. Various means have been suggested and are shown in the prior art whereby the feeding means for the meniscus is related to the coating speed, and whereby the feed to the reservoir is balanced with the amount being utilized in coating the tape. However, the complex problem of predetermining and automating the supply system in conjunction with a meniscus coating to provide a more uniform and smooth coating has not been solved for optimum results. Uniformity and smoothness of the coating is of extreme importance and is a critical feature of these tapes for example where surface irregularities are utilized as information storage means.

Accordingly, it is an object of this invention to provide an improved process of producing thermoplastic tape.

It is another object of this invention to provide an improved meniscus coating apparatus in the process of producing thermoplastic tape.

It is another object of this invention to provide an improved feed system for meniscus coating apparatus.

It is another object of this invention to provide an improved thermoplastic tape.

It is another object of this invention to provide a coating system utilizing unstable coating materials.

Briefly described, this invention includes an apparatus and process to provide an improved thermoplastic tape. The apparatus employed comprises a coating head utilizing a liquid meniscus supplied by a capillary feed system. The coating head includes a supply of a coating solution which is fed to a small orifice in the head, and a meniscus is generated between the orifice and an adjacent moving tape. A salient feature of this invention is the use of a meniscus coating method and apparatus to provide the thermoplastic layer on a thermoplastic tape where the meniscus is maintained by means of a unique feeding system which consists essentially of capillary action in a capillary tube. An improved evaporation process provides an electrically conducting metallic layer on the tape prior to meniscus coating.

This invention will be better understood when taken in connection with the following description and the drawings in which.

Figure 1:
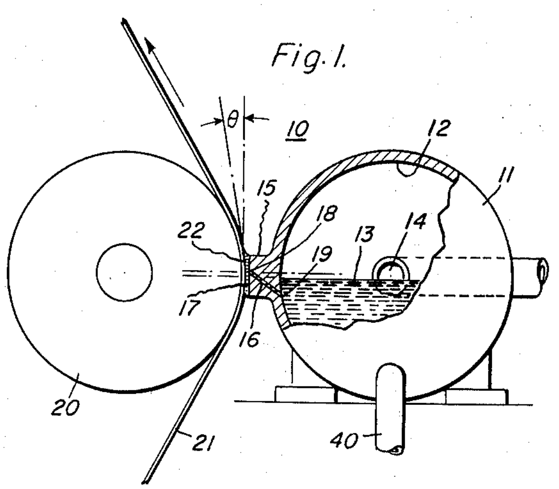
FIG. 1 is a preferred embodiment of the meniscus coater apparatus of this invention.

Referring now to FIG. 1 there is disclosed one preferred meniscus coating apparatus 10 as utilized in the teachings of this invention. Coating apparatus 10 includes a coating head 11 having a suitable reservoir or replenishment chamber 12 therein to contain a suitable coating solution 13, for example a polymer solution. Chamber 12 is illustrated as a drum-like configuration having an exit opening or overflow opening 14 to provide for the exiting of solution 13 out of chamber 12. An entrance conduit 40 is also provided so that the liquid coating solution 13 may circulate through the chamber 12 and through overflow opening 14 in order to maintain a predetermined level of coating solution within chamber 12. Chamber 12 also includes a projection or feeding head 15 which is provided with one or more capillary apertures or tubes 16 therethrough. Apertures 16 extend from the face 17 of feed head 15 to the interior of chamber 12 and are in angular relationship to the level of the liquid solution 13 within chamber 12 so that, the openings 18 of apertures 16 on face 17 are above the solution 13 level and above the openings 19 which are below the level of the liquid solution 13 in chamber 12. Openings 18 remain, during the operation of this apparatus, above the level of the solution within the chamber at all times. A back-up roller or drum member 20 is positioned closely adjacent projection 15 so that the entire apparatus is positioned and described as a pair of drums or cylinders arranged with their longitudinal axes in parallel and spaced apart relationship along a horizontal plane. The operation of coating a particular tape 21 is described in relation to the tape 21 being moved by roller 20 in the direction indicated. Roller 20 by means well known in the art is adjustable to vary the spaced apart relationship between projection 15 and roller 20. As is well known in the art of coating heads, a meniscus of the coating solution is formed between a moving surface and a source of coating solution for meniscus replenishing. Accordingly, a meniscus 22 is established between tape 21 and projecting head 15, and movement of the tape, as illustrated, in conjunction with meniscus 22 provides a continuous coating of the meniscus liquid on the tape, with the meniscus being replenished continually from reservoir in chamber 12. The meniscus 22 is maintained in position, as illustrated, by surface tension. The meniscus coating process requires continuous and modulated replenishment of the liquid in the meniscus at all times in order to in turn provide a uniform and predetermined coating on the thermoplastic tape. It has been discovered that such replenishment need not be controlled by various mechanical apparatuses and devices which heretofore have not only proven difficult to control with the preciseness necessary, but which also require constant attention. Indeed it is a most salient feature of this invention that capillarity is the essential means by which solution from chamber 12 is caused to replenish that in meniscus 22.

Capillarity is described with relation to the behavior of liquids in tubes of small diameter, i.e., capillary tubes, and is a consequence of surface tension. The phenomenon whereby liquids rise or are depressed in capillary tubes is known as "capillarity" or "capillary action." For example, it is seen in the rise of oil in a lamp wick and it partly accounts for the ascent of sap in plants. Certain laws relative to capillary action are expressed as follows: (1) liquids rise in tubes of about 3 millimeters diameter or less if they wet the tubes and the surface is concave upward (in larger tubes the rise or depression is negligible), (2) liquids are depressed in tubes of about 3 millimeters diameter or less if they do not wet the tubes and the surface is convex upward, and (3) the height of elevation or depression varies directly as the surface tension of the liquid and inversely as the radius of the tube and density of the liquid. If adhesion between the liquid and the tube is greater than the cohesion of the liquid, the liquid wets the tube. If cohesion is greater than adhesion the liquid does not wet the tube. For example, in the case of water and glass, the surface of water in glass is concave downward and with mercury in glass it is convex upwards. The contraction of the surface tends to lift the water but to depress mercury. A formula expressing the height or rise of a liquid in a capillary tube is given as $$h=\frac{2T}{rdg}$$

where T is the surface tension of the liquid with respect to the containing wall material, $r$ is the radius of the tube, $d$ is the density of the liquid, and $g$ is the gravity constant. Application of this natural phenomenon in this invention has been the key to optimum coatings. Capillary flow is an independent feature of this invention not relying or depending upon solution 13 flow into chamber 12, and is a constant process by its own inherent nature. Since meniscus 22 is separated from a source of supply by a capillary aperture or tube, and the meniscus feeding is above the level of the solution supply, dependence is predicated only on capillary flow within the bounds determined by the value of $h$ in the above formula, usually 2 or 3 millimeters. By the same token the coating process is limited by capillary flow. Therefore, proper rotation of roller 20 and tape 21 thereon is best described as being correlated between the linear velocity of the tape past meniscus 22 and the flow of liquid through capillary tubes 16. The number and shape of capillary tubes 16 may be varied to provide more or less coating or higher tape velocity. Maximum tape velocity is of course restricted by velocity of solution flow through the capillary tubes 16. This capillary flow method provides a constant coating of a dielectric on tape 21 regardless of the circulation or slight variations of the level of solution 13 in reservoir 12. The process is self-supplying and self-modulated and may be easily started and stopped at will without affecting the coating apparatus or its operation. Capillary flow is maintained independent of any external means which tend to alter its natural function, i.e., no pressure is exerted on the solution supply or in chamber 12 to force or move solution 13 to the capillary at any greater velocity than its natural velocity, nor it is necessary to maintain the outlet of the capillary tubes on the same plane as the level of solution 13. As described above, the flow through the capillary orifices or tubes 16 is maintained substantially as a natural uninhibited function to provide constant flow condition.

It has been discovered that as a result of the use of this apparatus and process a more uniform or smooth coating is obtained as compared to other processes. One of the more important features contributing to smoothness is the angle $\theta$. The angle $\theta$ is best described as an angle having as one leg, a line drawn as a tangent to the circumference of roller 20 at the leaving direction of the tape and leaving or lagging portion of meniscus 22. The other leg is the vertical plane between the roller 20 and head 11. Reference is made to the angle $\theta$ in FIG. 1. It can be easily understood that variations in the size of the meniscus 22 affect the angle θ, with size of the meniscus also being a function of solution flow and variations in flow as well as density, surface tension, etc. Flow, however, is more important and the capillary feature of this invention is the prime factor in automatically controlling flow so that the meniscus maintains a constant size thereby maintaining the angle θ constant. Those skilled in the coating art will recognize the angle θ as determining the amount of coating liquid which drains back from the tape to the meniscus during the coating operation to influence coating thickness and uniformity. Inability to maintain angle θ constant is a principal difficulty with other meniscus coating methods. For example, some methods control the flow of coating liquid to the meniscus by attempting to maintain a solution level equal to the level of a meniscus, or by predetermining flow. Such problems of ultra precise flow control are effectively eliminated.

Figure 2:
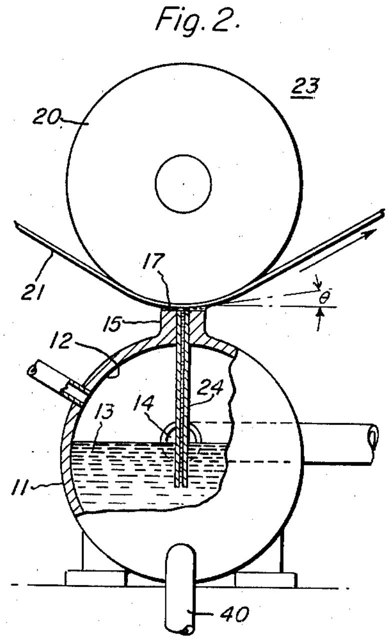
FIG. 2 is a modification of the invention illustrated in FIG. 1.
Figure 3:
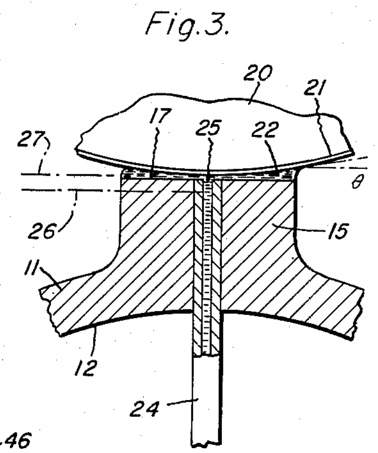
FIG. 3 is an enlarged sectional view of the upper reaches of the capillary tubes of FIG. 2.

Various additional and complementary arrangements may be utilized or employed in the teachings of this invention. In FIG. 2 a capillary fed meniscus coating apparatus 23 includes a roller or drum 20 and a meniscus coating head 11 arranged in vertical relationship. The drum or chamber 12 and roller 20 have their axis parallel in a vertical plane while tape passed therethrough generally horizontally but defining an acute angle with a true horizontal plane to the vertical plane as described. Coating head 11 includes a replenishment chamber 12 and aperture 14 to maintain a predetermined level of coating solution 13 therein. One or more capillary tubes 24 extend from face 17 of projection 15 vertically downwards into solution 13. Capillary tubes 24 may be of such dimension in conjunction with the level of liquid solution 13 so that capillary flow takes place for flow of solution 13 to the ends 25 of tubes 24 at face 17 of projection 15. However, in some instances increased flow is desired and capillarity may be complemented by external forces or pressures. Also, because of the configuration and arrangement of parts, the level of solution 13 may be spaced an excessive distance from the top of tubes 24 so that capillary rise itself is insufficient to feed the meniscus. Accordingly, chamber 12 may be subjected to internal gas pressure to cause solution 13 to rise in capillary tubes 24. A limitation is imposed on this additional process. In order to be continuously availing of the capillary feed feature, the pressure or force exerted on the surface of solution 13 must not exceed that which will cause the solution to rise by means of capillary flow. This limitation is best described with respect to FIG. 3 which is an enlarged illustration of the feed system of FIG. 2. In FIG. 3, assume that the distance between solution 13 level and top opening 25 of capillary tubes 24 is 10 millimeters, and capillary rise of solution 13 in tubes 24 will only reach a height of 4 millimeters. The added pressure should be that which will only cause a rise of about 6 millimeters. Accordingly, a pressure is utilized which causes the liquid to rise 6 millimeters in the tubes 24 and, in the final analysis, capillary action causes the liquid to rise the remaining 4 millimeters. More specifically, in FIG. 3 the pressure exerted upon solution 13 level will only cause solution 13 to rise to dash line 26, about a 6 millimeter rise. Thereafter, capillary flow will cause solution 13 to rise to dash line 27, about 4 millimeters above dash line 26. Usually the rise is adjusted so that capillary flow rise is less than its maximum.

Tape 21 is then moved, by roller 20, while in contact with meniscus 22 to provide a uniform coating of solution 13 thereon. As in the description of FIG. 1, the linear velocity of tape 21 is matched to the capillary feed system so that a self-modulating, self-feeding process is provided. Slower speeds are warranted because the capillary feed will inherently provide the meniscus with the amount of liquid withdrawn therefrom. Higher velocities than maximum capillary flow conditions are inoperative and undesirable.

Figures 4, 5:
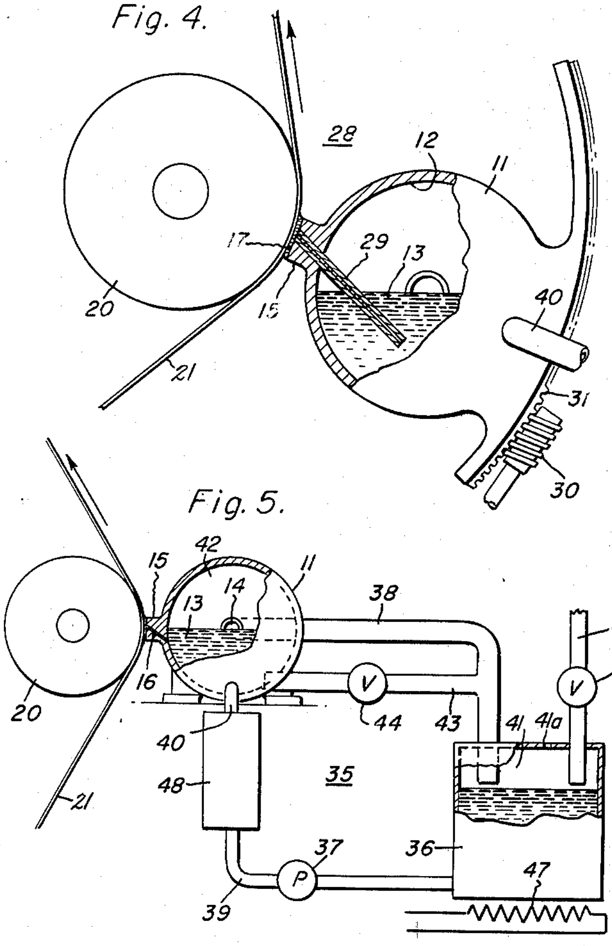
FIG. 4 is an additional modification of the invention of FIG. 1.
FIG. 5 is an exemplary illustration of process of utilizing the meniscus coating capillary feed system.

FIG. 4 is a further modification of the apparatus of FIGS. 1–3. In FIG. 4, arrangement 28 includes a coating head 11 which is positioned with its axis parallel to the axis of roller 20 but at an angle below the horizontal plane. In this instance, a capillary slot 27 is employed to provide a flow of solution 13 to meniscus 22. Coating head 11 may be radially adjusted to provide control over the angle θ and the coating operation. For example, in FIG. 4 utilizing the axis of roller 20 as an axis of revolution, coating head 11 is rotated about roller 20. One exemplary means of adjustment may include a suitable worm 30 in engagement with ring gear 31. By means of this adjustment not only may capillary flow be aided or complemented but also the angle θ may be adjusted for optimum coating thickness and smoothness. Additionally, rotation of head 11 provides a dual operation, i.e., with capillary flow only or together with a pressure assist.

FIG. 5 is a preferred arrangement and use of a solution system for the apparatus as described in FIGS. 1–4, more particularly for example that as illustrated in FIG. 1 and the description thereof. In FIG. 5, 35 denotes a system including a coating head 11, a storage receiver or reservoir 36 and a pump 37 all connected in circuitous fluid flow series relationship by means of conduits 38 and 39. Coating head 11 includes in one form, a hollow cylindrical chamber 12 containing a liquid coating solution 13. This solution is maintained at a predetermined level by means of an inlet 40 and an elevated exit 14 through which coating solution 13 is pumped. Coating head 11 includes the projection 15 having the usual capillary apertures 16 extending therethrough as depicted in FIG. 1. The coating solution level is also maintained, as in FIG. 1, below the capillary exit level. Ordinarily exit 14 is merely utilized as an overflow means so that the level of the coating solution is not extensively varied by varying pump output.

The usual method of operation includes circulating a volume of the solution 13 through the coater head 11 which is several times greater than the volume required to replenish the meniscus. The excess solution over the replenishing amount overflows through aperture 14 and conduit 38 for return to the storage receiver 36. The overflow aperture 14 and the conduit 38 connecting chamber 12 to the coating solution storage receiver 36 are large in relation to the volume of overflow so that the returning liquid does not completely fill conduit 38. Conduit 38 thus also serves to connect the vapor space 41 in the solution storage receiver 36 with the vapor space 42 in coater head 11 and prevents accumulation of vapors or gas in either place from opposing solution 13 flow. Alternatively, a separate equalizing conduit may be connected from the top of storage vessel 36 to the top of the coater head 11. System 35 also includes a bypass conduit 43, and valve 44, which also connects coater head 11 to reservoir 36. Conduit 43 connects with coater head 11 at about the same level as entrance 40. Valve 45 and conduit 46 are employed to replenish solution in reservoir 36 from a suitable supply.

With this system, there are no problems related to starting and stopping of the coating operation. Valves 44 and 45 in FIG. 5 control both functions as follows. When the apparatus is in the starting condition, valve 44 is open. The circulating pump 37 pumps solution 13 from the storage receiver 36 through conduit 39 to inlet 40. The solution flows out of chamber 11 through conduit 43 without contacting the capillaries 16, and returns to the storage receiver 36. Closing valve 44 causes solution 13 to accumulate in chamber 12 in coater head 11, and the solution level rises to cover the internal exposed ends of capillaries 16 with the solution flowing out overflow aperture 14. The capillaries fill with solution automatically. Mere touching of tape 21 briefly to the ends of the capillaries 16 forms a meniscus, and commencing tape motion results in the starting operation. When stopping the operation, valve 44 is opened and the coating liquid solution 13 level falls below the internally exposed ends of the capillaries 16. At the same time, the small quantity of liquid in the capillaries is quickly used by the meniscus, the meniscus disappears, and coating action ceases. The meniscus is always replenished by exactly the amount of liquid which has been removed therefrom. Roll coaters tend to oversupply or undersupply the meniscus and require close supervision for this reason. The capillary fed meniscus compensates automatically for changes and rate of solution removal, and for changes in the size of the meniscus by changing the rate of flow through the capillaries until the meniscus returns to its initial size. This automatically maintains a constant size meniscus, less attention is required, and fewer variations in coating thicknesses occur.

When coating solutions contain volatile solvents, roll coaters must be enclosed as much as possible to prevent solvent loss from the roll. With the capillary fed meniscus, the only solvent loss is from the meniscus itself. However, volatile solvent loss from the meniscus can be substantial enough so that the meniscus liquid is measurably more concentrated than the coating solution supplied to the meniscus. Meniscus solution concentration is important in determining the thickness of the resulting coating. By varying the size of the meniscus so that greater or less surface area is available to evaporate the solvent, the concentration of meniscus liquid and therefore the coating thickness can be also altered. Automatic maintenance of meniscus size as mentioned previously is important for achieving constant coating thicknesses when using the meniscus concentrated solution. Therefore, capillary fed meniscus operation is particularly well adapted to coating solutions containing the more volatile solvents.

A closed system (except for vent 41*a* in the top of vessel 36) as illustrated in FIG. 5 has several advantages. Volatile solvent solutions can be handled in a closed feed system without affecting a loss of solvent and accompanying gradual change in the thickness of the coating. Since solvent is conserved in the closed system, the coating solution may be heated or cooled as it circulates through the circuit. In one embodiment the capillary feed system has been utilized to provide a meniscus in the coating of a polymer on tape as part of the general process of preparing thermoplastic tape.

A particular operative example of this invention utilized an unstable polymer solution 13 comprising about 50 percent benzene, 20 percent toluene, and 30 percent solids, by weight. The 30 percent by weight solids included by weight, 90 percent diphenyl silicone polymer and 10 percent polyphenylene oxide. Reference is made to copending application Serial No. 8,587, Edith M. Boldebuck, filed February 15, 1960, and now Patent No. 3,063,872, assigned to the same assignee as the present invention, for a description of processes of preparing the polymer and solution. This solution strength of the particular thermoplastic polymer is not stable at room temperature, which is a preferred coating temperature. Instability is apparent through polymer precipitating out of the solution and also through the formation of gel particles. Both phenomena result in rough, non-uniform and unsatisfactory coatings. This problem is overcome in the closed feed system of FIG. 5 by maintaining the coating solution storage receiver 36 at an elevated temperature of about 140° F., where the coating solution is stable. Various heating means for receiver 36 may be utilized and for example an electrical resistance heater element 47 is illustrated adjacent receiver 36. A cooler or heat exchanger 48 is inserted in inlet line 39 so that coating solution 13 arriving at coater head 11 has just been cooled to a coating temperature about 75° F. The coating head overflow returns to storage receiver 36 and is reheated there. The volume of solution 13 in storage receiver 36 is greater by comparison than the volume in conduit 39 and coater head 11 and the flow or velocity through these items is chosen large enough so that no appreciable precipitation of polymer occurs during the short period of time when the solution is in the cooled and unstable condition. By this technique of hot storage, cooling immediately prior to application, and solvent conservation by closed system, the unstable volatile thermoplastic solution is coatable in a smooth uniform layer. Tape 21 in the same operative example, continuing with the above described solution, was a polyethylene terephtalate (which can be obtained by the transesterification of esters of terephthalic acid with divalent alcohols, for example, ethylene glycol), as described in U.S. Patent 2,641,592, Hofrichter, such polyethylene terephthalate being commercially available and produced by E. I. du Pont de Nemours and Company of Wilmington, Delaware, under the name "Cronar." Tape 21 contained an evaporated metallic chrome coating of about 40 angstroms thickness and was 35 millimeters in width. Coating head 11 contained a single horizontal row of 20 equally spaced capillary apertures of 20 one-thousandths of an inch (0.020") diameter disposed to provide a coating on tape 21, of 25 millimeters in width. Tape velocity was about 12 feet per minute.

Operation of the process as described with respect to FIG. 5 provided a smooth uniform coating of about 6 microns in thickness, of a uniformity better than a tolerable variation in thickness of $\pm 3/4$ micron in one thousand feet of tape, with a thickness gradient or slope of less than 3 interference lines per millimeter in any direction.

The thermoplastic tape produced as described has been employed as a recording medium with excellent results. In the aforementioned copending applications of William E. Glenn, Jr., Serial Nos. 698,167 and 783,584, there are disclosed and claimed an electronic method and apparatus for recording, storing and reproducing photographic images and technical data wherein tape 21 as described has been employed. According to this method, technical data and photographic images are first converted electronically into coded signals. These signals are further reduced to variations in the intensity of a beam of electrons and the electron beam with its negatively charged particles is used to scan a special surface so as to introduce onto this surface a pattern of negative charges (from electrons deposited) which arrange themselves in accordance with the data or image to be recorded. This pattern of electric charges is essentially the negative of the composite films, sheets, slides, etc., which is later developed by converting the pattern of electrical charges on the heat deformable layer to a pattern of depressions, ridges, etc., that can be observed optically.

Best results are obtained in this invention when the entire thermoplastic tape is prepared by a process which consists of separate but combined process operations. These operations were employed to prepare the tape for the above-described application of meniscus coating of a thermoplastic layer. The operations are generally denoted as cleaning 49, washing or extracting 50, devolatilizing 51, in FIG. 6, and applying an electrically conducting layer 52, stabilizing the conducting layer 53, and applying the thermoplastic layer 54, all in FIG. 7. Each of these operations will be discussed with reference to the schematic illustration of FIGS. 6 and 7. The process and materials utilized represent a working example.

Figure 6:
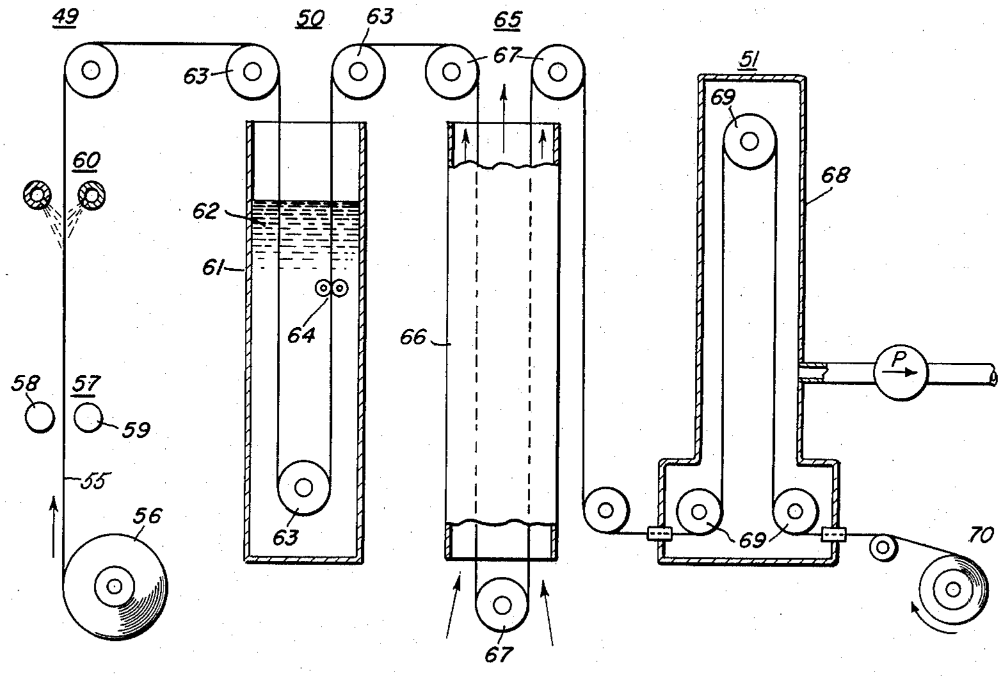
FIG. 6 is a schematic diagram of a process of preparing a tape for meniscus coating.

In FIG. 6 the cleaning operation 49 is intended to remove from the surface of the supporting member, dust, dirt or other particular refuse which may be retained on the surface of the supporting member by the action of gravity, or by electrostatic charge attraction, or by being partially embedded in the surface. Gravity held material is conveniently removed by a blast of clean air directed towards the surface. Material held by electrostatic charge attraction is conveniently removed by neutralizing the electric charges on the surface of the supporting member and on the particular material before directing cleaning air toward the surface. In FIG. 6, tape 55 is the backing or supporting portion of a thermoplastic tape. This tape is a refined grade of polyethylene terephthalate commercially available under the name of Cronar. In FIG. 6, tape 55 is unrolled from a roll or supply source 56 to pass through an air ionizer 57. Ionizer 57 includes a pair of chambers 58 and 59 which contain polonium isotope and emit alpha particles directed to the tape surfaces to neutralize electric charges. From the ionizer 57 tape 55 now passes through an air blast apparatus 60 which directs streams of air against tape 55 to dislodge particles of material which were neutralized in ionizer 57. The cleaning process may not be a necessary process depending on the condition of the tape after production thereof. Such a tape may be received or produced in a satisfactory clean condition.

From the aforementioned cleaning process tape 55 is led into a washing or extraction apparatus 50. A satisfactory thermoplastic tape is uniform, non-volatile in a vacuum, and physically stable under the heating required to develop the electron surface pattern into an optical image. The washing operation is intended to remove from the supporting member component parts which would interfere with attaining these properties. These parts may be, by way of example, polyvinyl alcohol, gelatin, the cyclic dimer and trimer of ethylene terephthalate, etc. The washing apparatus consists of a tank 61 containing a solution 62 of water, alcohol and a commercial detergent or surfactant to remove polyvinyl alcohol. The commercial detergent should be one leaving minimum residue. Sodium lauryl sulfonate has been employed in this process. Gelatin may be removed by extraction with water in a hydrochloride oxidizing agent, polyvinylidene chloride may be removed by extracting with methylethyl ketone or tetrahydrofuran. Troublesome low molecular weight terephthalates may also be extracted in useful measure by methylethyl ketone or tetrahydrofuran or trichloroethylene. By means of suitably arranged rollers 63, tape 55 is passed vertically downward through solution 62 in tank 61 and then vertically upwards out of tank 61. During the vertically upward movement, tape 55 is caused to pass through or between a pair of felt rolls 64 to remove particles which are partly embedded in the tape. These rolls are adapted to rotate with a slight dragging action on tape movement. Soft felt dislodges the particles and stores them so that they can be rinsed out by liquid flow at a later time.

From the washing process 50, tape 55 moves through a drying apparatus 65 which generally entails simply a heated chamber 66. By means of rollers 67, tape 55 is caused to move vertically downwardly, to reverse, and move vertically upwards through chamber 66. Excess solvent is removed by passing heated air through chamber 66 adjacent tape 55. Other gases such as $CO_2$ and nitrogen may also be employed. Drying apparatus 65 may take other and various forms, may be a natural process or combined with other processes such as devolatilizing.

The devolatilizing operation 51 removes, from the supporting member, water vapor and residual extractant remaining from the extraction step. Both are volatile in vacuum and interfere with application of a metallic electrically conducting coating. The devolatilizing operation consists of a vacuum chamber 68 wherein rollers 69 are employed to pass tape 55 vertically upwards to reverse and pass vertically downward. In vacuum chamber 68, tape 55 is subjected to low pressure conditions of about $1\times10^{-3}$ mm. Hg. This low pressure condition in conjunction with the heated tape from dryer 65 removes water vapor and residual extractant.

Figure 7:
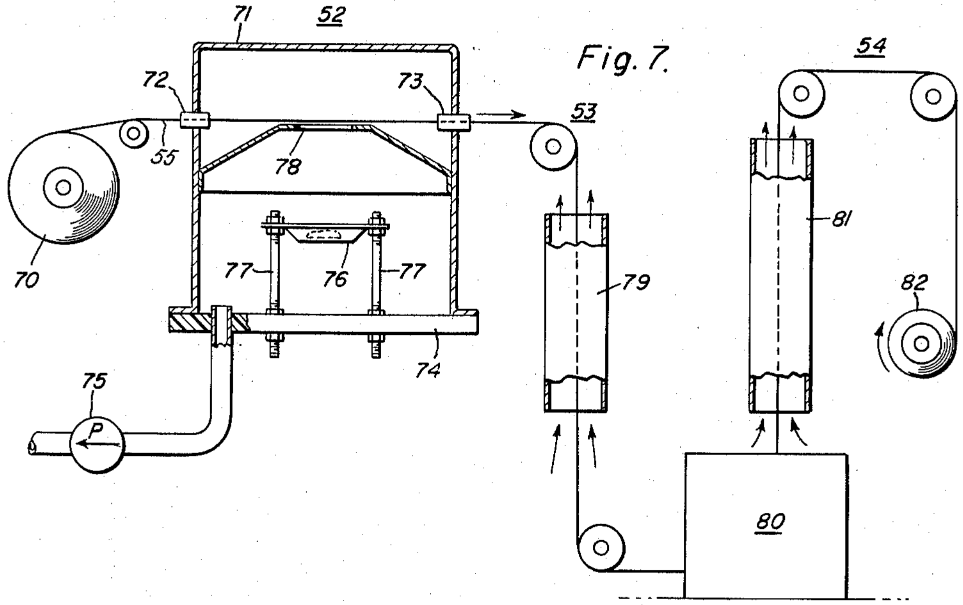
FIG. 7 is a schematic illustration of the evaporation and coating process and apparatus.

After emerging from the devolatilizing process in vacuum chamber 68, tape 55 is wound on a drum or storing means 70 preparatory for the second portion of processing as illustrated in FIG. 7. Tape linear velocity was about 10 ft. per minute through the processes as described for FIG. 6. However, this velocity may be increased by choice of suitable equipment to be continuous with the following process.

Drum 70 is then positioned to unreel tape 55 for the conductive coating, stabilizing, and thermoplastic coating processes. In this example tape 55 is coated with a transparent electrical conducting layer, e.g., chromium. The conducting layer is a critical feature of this process and less than desirable or specified properties render the entire tape process useless for the original intended purposes. It is an object of this invention to provide a thermoplastic tape in a continuous process, such a continuous process being far more practical, economical and conducive to uniformity than a series of processes as is well understood. Because tape 55 is, by its very nature, extensive in length and rather large in size when rolled on a drum, a vacuum chamber set up for conductive film evaporation represents various problems. For example, the entire roll is ordinarily placed inside a vacuum chamber in order to maintain a high vacuum by eliminating seals. Otherwise, a tape must pass through seals in and out of the vacuum chamber walls and such seals are deterrent to low pressure conditions below about $1\times10^{-6}$ mm. Hg, which has been indicated as necessary. Furthermore, such a practice is interrupting to a desired continuous process. It has been discovered that a metallic electrically conductive coating may be applied to tape 55 at higher pressures by a continuous process, as illustrated in FIG. 7.

In FIG. 7, tape 55 is unrolled from drum 70 to pass through a vacuum chamber 71 by means of entrance and exit seals 72 and 73. Seals 72 and 73 are not required to be excellent seals because, as mentioned, the evaporation process is carried out at pressures on the order of $1\times10^{-4}$ to $3\times10^{-3}$ mm. Hg. It is preferred, however, that they be chosen for optimum sealing characteristics. An example of such a seal is a well known labyrinth type.

Chamber 71 rests upon a suitable support 74 and is evacuated by means of a vacuum pump 75 operatively connected thereto. Chromium employed for evaporation purposes is high purity chromium powder which has been hydrogen reduced and baked out in vacuum. As known in the art, the chromium powder is supported or contained in a boat support 76. Boat 76 is heated by electrical resistance heating by connecting boat 76 to a suitable source of power through legs 77. It has been discovered that several salient problems are encountered in this process. While, ordinarily, various metals may be evaporated on films generally, in this process chromium must be heated to about 1800° C. for proper evaporation. By the same token the melting point of tape 55 is only about 170° C. Together with known requirements of very low pressures, these conditions are indeed deterrents. Spacing the chromium further from the tape leads to a chromium oxide coating on the tape instead of chromium. Spacing too close will cause melting. An excellent transparent coating of chromium is deposited on tape 55 by the following procedure. Tape 55 is caused to move through vacuum chamber 71 at about 100–150 feet per minute. Chamber pressure is maintained at about $5\times10^{-4}$ mm. Hg. Boat 76 is spaced about 5–6 inches from tape 55 and heated. By this means tape 55 is caused to move through chamber 71 at a sufficient velocity to prevent overheating by the heat of evaporation. Tape 55 is, in this example, 16 mm. in width. This tape 55 passes over a screen or masking element 78. Element 78 contains an aperture therethrough of 3 inches in length so that only a 3-inch length of tape 55 is exposed to chromium evaporation. This opening exposes a restricted portion of tape 55 to a high concentration of chromium molecules. By these means of high concentration, high temperatures, and high tape velocity, undesirable molecules of residual gases are restrained from contacting the tape and affecting the good transparent coating as obtained.

After evaporation of the chromium coating, tape 55 is passed through stabilizing chamber 79 where it is subjected to clean air or oxygen for stabilizing the chromium coating and cooling the tape. It is the nature of evaporated coatings that they do not lose all of their energy of heat evaporation at the time they condense on the supporting member. Instead, some is retained in the coating as energy of new surface formation and some is retained as a heightened chemical reactivity. Retained energy tends to be lost from the coating gradually. Thus, conducting coatings supplied by evaporation in thicknesses thin enough to be optically transmitting subsequently suffer significant time dependent changes in physical and chemical properties. Chemical reaction with the environment and changes in optical transmission, resistivity, and crystal size are commonly observed. The stabilizing operation assists the discharge of retained energy from the conducting coating to a level low enough that any later changes will be of a minor magnitude. This was done by thermal heating, and may also be done by chemical reaction. Thermal heating allows the atoms or molecules to move more rapidly in the conducting coating as they seep out and settle into low energy stable configurations. Chemical reaction to form an oxide or the salt of an acid for example is useful with materials such as nickel and chromium to form a stabilizing surface layer. It is preferred to use both heat and chemical reaction as stabilizing influences, although not necessarily at the same time.

After the stabilizing process, tape 55 passes through a coating apparatus 80 illustrated as a block diagram 80. Block 80 is illustrative of the meniscus coater and system of FIG. 4 of the drawings appropriately scaled for increased tape velocity. After coating, tape 55 passes through a heated air drying chamber 81 for drying of the thermoplastic coating. The finished tape 55 is stored or accumulated on a final winding reel or drum 82.

In connection with the description of the operation of the various processes as described, the following additional and more specific examples are included.

In these examples the tape or supporting member, unless otherwise indicated, is a polyethylene terephthalate film commercially available from E. I. du Pont de Nemours and Company of Wilmington, Delaware. Specifically in Examples 1–8 and 12, the supporting member is a refined grade of polyethylene terephthalate commercially available under the name Cronar as described with respect to FIG. 5 of this specification. In Examples 9, 10 and 13 the polyethylene terephthalate tape is commercially available under the name Mylar. In Examples 11 and 14 the supporting member was a polycarbonate film commercially available from the General Aniline and Film Company under the name Plestar. This film is an aromatic polycarbonate film such as prepared from the reaction product of 2,2-bis(4-hydroxy phenyl), propane and phosgene in the presence of an acid acceptor. In Examples 2 and 3 a commercial detergent was used in the washing cycle which left a minimum residue. Any detergent of the cleaning capacity such as is necessary for cleaning glass components prior to fabricating glassware equipment therefrom may be used, since such detergents must be capable of cleaning so as to leave no residual film on the surface to interfere with glass-to-glass bond during fabrication.

In all examples the thermoplastic coating was that polymer solution as described with respect to FIG. 5, and the described method and apparatus of FIG. 5 was also employed in each instance.

The processes described for each example are those processes as applicable as described with respect to FIGS. 6 and 7.

*Example 1*

| | |
|---|---|
| Supporting member ---- | Polyethylene terephthalate film. |
| Washing ------------- | Washed 5 minutes in methylethylketone at 70° C.<br>Wet rubbed both sides with felt during extraction.<br>Dried 5 minutes in air at 110° C. |
| Devolatilizing --------- | Devolatilized 40 minutes at 110° C. and 10$\mu$ pressure. |
| Conductive coating ---- | Evaporated chromium layer 40 A. thick. |
| Stabilizing conducting layer ------------- | Exposed chromium layer to air (oxygen). |
| Thermoplastic coating -- | Coated with a thermoplastic 8$\mu$ thick.<br>Dried 5 minutes at 130° C. |

*Example 2*

| | |
|---|---|
| Supporting member ---- | Polyethylene terephthalate film. |
| Washing ------------- | Washed 1 minute in $H_2O$ and detergent at 80° C.<br>Wet rubbed both sides with felt.<br>Rinsed 1 minute in $H_2O$ at 25° C.<br>Dried 5 minutes at 110° C. |
| Devolatilizing --------- | Devolatilized 40 minutes at 110° C. and 10$\mu$ pressure. |
| Conductive coating ---- | Evaporated chromium layer 40 A. thick. |
| Stabilizing conducting layer ------------- | Exposed chromium layer to air (oxygen). |
| Thermoplastic coating -- | Coated with a thermoplastic layer 8$\mu$ thick.<br>Dried 5 minutes at 130° C. |

*Example 3*

| | |
|---|---|
| Supporting member ---- | Polyethylene terephthalate film. |
| Washing ------------- | Washed 1 minute in $H_2O$ and detergent at 80° C.<br>Wet rubbed both sides with felt.<br>Rinsed 1 minute in $H_2O$ at 25° C.<br>Dried 5 minutes at 110° C. |
| Devolatilizing --------- | Devolatilized 40 minutes at 110° C. and 10$\mu$ pressure. |
| Conductive coating ---- | Evaporated chromium layer 40 A. thick. |
| Stabilizing conducting layer ------------- | Exposed chromium layer to air (oxygen). |
| Thermoplastic coating -- | Coated with a thermoplastic layer 8$\mu$ thick.<br>Dried 5 minutes at 130° C. |

*Example 4*

| | |
|---|---|
| Supporting member ---- | Polyethylene terephthalate film. |
| Cleaning ------------- | Subjected to air blast to remove dust, lint and dirt. |
| Devolatilizing --------- | Devolatilized 40 minutes at 110° C. and 10$\mu$ pressure. |
| Conductive coating ---- | Evaporated chromium layer 40 A. thick. |
| Stabilizing conducting layer ------------- | Exposed chromium layer to air (oxygen). |
| Thermoplastic coating -- | Coated with a thermoplastic layer 7$\mu$ thick.<br>Dried 5 minutes at 130° C. |

*Example 5*

| | |
|---|---|
| Supporting member ---- | Polyethylene terephthalate film. |
| Washing ------------- | Washed 5 minutes in methylethylketone at 70° C. |
| | Wet rubbed both sides with felt. |
| | Dried 5 minutes at 110° C. |
| Conductive coating ---- | Evaporated chromium layer 40 A. thick. |
| Stabilizing conducting layer -------------- | Exposed chromium layer to air (oxygen). |
| Thermoplastic coating -- | Coated with a thermoplastic layer 7$\mu$ thick. |
| | Dried 5 minutes at 130° C. |

*Example 6*

| | |
|---|---|
| Supporting member ---- | Polyethylene terephthalate film. |
| Washing ------------- | Washed 5 minutes in tetrahydrofuran at 60° C. |
| | Wet rubbed both sides with felt. |
| | Dried 5 minutes at 110° C. |
| Devolatilizing --------- | Devolatilized 40 minutes at 110° C. and 10$\mu$ Hg pressure. |
| Conductive coating ---- | Evaporated chromium layer 40 A. thick. |
| Stabilizing conducting layer -------------- | Exposed chromium layer to air (oxygen). |
| Thermoplastic coating -- | Coated with a thermoplastic layer 7$\mu$ thuck. |
| | Dried 5 minutes at 130° C. |

*Example 7*

| | |
|---|---|
| Supporting member ---- | Polyethylene terephthalate film. |
| Washing ------------- | Washed 5 minutes in methylethylketone at 70° C. |
| | Wet rubbed both sides wth felt. |
| | Dried 5 minutes at 110° C. |
| Devolatilizing --------- | Devolatilized 40 minutes at 110° C. and 10$\mu$ Hg pressure. |
| Conductive coating ---- | Evaporated chromium layer 40 A. thick. |
| Stabilizing conducting layer -------------- | Exposed chromium layer to air (oxygen). |
| Thermoplastic coating -- | Coated with a thermoplastic layer 7$\mu$ thick. |
| | Dried 5 minutes at 130° C. |

*Example 8*

| | |
|---|---|
| Supporting member ---- | Polyethylene terephthalate film. |
| Washing ------------- | Washed 5 minutes in tetrahydrofuran at 60° C. |
| | Wet rubbed both sides with felt. |
| | Dried 5 minutes at 110° C. |
| Devolatilizing --------- | Devolatilized 40 minutes at 110° C. and 10$\mu$ Hg pressure. |
| Conductive coating ---- | Evaporated chromium layer 40 A. thick. |
| Stabilizing conducting layer -------------- | Exposed chromium layer to air (oxygen). |
| Thermoplastic coating -- | Coated with a thermoplastic layer 7$\mu$ thick. |
| | Dried 5 minutes at 130° C. |

*Example 9*

| | |
|---|---|
| Supporting member ---- | Polyethylene terephthalate film. |
| Washing ------------- | Washed 5 minutes in methylethylketone at 70° C. |
| | Wet rubbed both sides with felt. |
| | Dried 5 minutes at 120° C. |
| Devolatilizing --------- | Devolatilized 40 minutes at 110° C. and 10$\mu$ Hg pressure. |
| Conductive coating ---- | Evaporated chromium layer 40 A. thick. |
| Stabilizing conducting layer -------------- | Exposed chromium layer to air (oxygen). |
| Thermoplastic coating -- | Coated with a thermoplastic layer 7$\mu$ thick. |
| | Dried 5 minutes at 130° C. |

*Example 10*

| | |
|---|---|
| Supporting member ---- | Polyethylene terephthalate film. |
| Cleaning ------------- | Discharged surface electricity in ionized air. |
| | Subjected to air blast to remove dust, lint and dirt. |
| Devolatilizing --------- | Devolatilized 40 minutes at 110° C. and 10$\mu$ Hg pressure. |
| Conductive coating ---- | Evaporated chromium layer 40 A. thick. |
| Stabilizing conducting layer -------------- | Exposed chromium layer to air (oxygen). |
| Thermoplastic coating -- | Coated with a thermoplastic layer 7$\mu$ thick. |
| | Dried 5 minutes at 130° C. |

*Example 11*

| | |
|---|---|
| Supporting member ---- | Polycarbonate film. |
| Cleaning ------------- | Discharged surface electricity in ionized air. |
| | Subjected to an air blast to remove dust, lint and dirt. |
| Devolatilizing --------- | Devolatilized 40 minutes at 110° C. and 10$\mu$ Hg pressure. |
| Conductive coating ---- | Evaporated chromium layer 40 A. thick. |
| Stabilizing conducting layer -------------- | Exposed chromium layer to air (oxygen). |
| Thermoplastic coating -- | Coated with a thermoplastic layer 7$\mu$ thick. |
| | Dried 5 minutes at 130° C. |

*Example 12*

| | |
|---|---|
| Supporting member ---- | Polyethylene terephthalate film. |
| Washing ------------- | Washed 5 minutes in methylethylketone at 70° C. |
| | Wet rubbed both sides with felt. |
| | Dried 5 minutes at 110° C. |
| Devolatilizing --------- | Devolatilized 40 minutes at 110° C. and 10$\mu$ Hg pressure. |
| Conductive coating ---- | Evaporated ZnS 600 A. thick. |
| | Treated with $CuSO_4$ to form CuS layer 200 A. thick. |
| Stabilizing conducting layer -------------- | Heated in air 15 minutes at 130° C. |
| Thermoplastic coating -- | Coated with a thermoplastic layer 7$\mu$ thick. |
| | Dried 5 minutes at 130° C. |

*Example 13*

| | |
|---|---|
| Supporting member | Polyethylene terephthalate film. |
| Cleaning | Discharged surface electricity in ionized air. Subjected to an air blast to remove dirt, lint and dust. |
| Devolatilizing | Devolatilized 40 minutes at 110° C. and 10$\mu$ Hg pressure. |
| Conductive coating | Evaporated ZnS. Treated with $CuSO_4$ to form CuS layer 200 A. thick. |
| Stabilizing conducting layer | Heated in air 15 minutes at 130° C. |
| Thermoplastic coating | Coated with a thermoplastic layer 7$\mu$ thick. Dried 5 minutes at 130° C. |

*Example 14*

| | |
|---|---|
| Supporting member | Polycarbonate film. |
| Cleaning | Discharged surface electricity in ionized air. Subjected to an air blast to remove dirt, lint and dust. |
| Devolatilizing | Devolatilized 40 minutes at 110° C. and 10$\mu$ Hg pressure. |
| Conductive coating | Evaporated indium in oxygen. |
| Stabilizing conducting layer | Heated 15 minutes at 130° C. to oxidize to form transparent layer. |
| Thermoplastic coating | Coated with a thermoplastic layer 7$\mu$ thick. Dried 5 minutes at 130° C. |

The practice of this invention as indicated in the above examples provided an extremely smooth and uniform coating of a thermoplastic composition on a supporting or backing member which contains a corresponding smooth electrically conducting layer. Since the smoothness requirements of a thermoplastic tape are very critical and very little variation is acceptable, a tape prepared in accordance with the described preliminary processes and coated with the capillary fed meniscus coater is a much improved thermoplastic recording medium.

Thermoplastic tape from each of the above examples has been utilized as information recording means with excellent results. These results are obtained primarily because of the important contributing features of the meniscus coater and the metal coating process and secondly, from the preceding preparation processes. It is understood that depending on the condition of the backing or supporting member some of the process preparation steps may be eliminated or modified accordingly. The tape produced by the coating process has superior surface smoothness which is a significant improvement over other tapes. To obtain such surface characteristics, prior art complicated and extensive 4-roll apparatus has been employed requiring much control, attention, and highly skilled personnel. The same and better results are now achieved by means of this invention with a simple and stable meniscus coater.

While a specific method and apparatus in accordance with this invention has been described and shown, it is not desired that the invention be limited to the particular description nor to the particular configurations illustrated, and it is intended by the appended claims to cover all modifications within the spirit and scope of this invention.

What I claim as new and desire to secure by Letters Patent of the United States is:

1. A method of providing an improved flexible, optically-transparent thermoplastic tape comprising passing a polymer tape member through a solvent bath to remove surface impurities, devolatilizing said tape member by passing through a vacuum chamber, continuously evaporating an electrically conductive metal coating on said tape member by subjecting a restricted portion of said tape member to a high concentration of evaporating metal at temperatures above the melting point of said tape member while moving the tape through said chamber at a rapid pace to prevent melting thereof, chemically stabilizing said tape member during cooling thereof and meniscus coating said conductive layer with a thermoplastic layer.

2. A method of providing an improved flexible, optically-transparent thermoplastic tape comprising passing a polymer tape member through a solvent bath to remove surface impurities, devolatilizing said tape member by passing through a vacuum chamber, continuously evaporating an electrically conductive metal coating on said tape member by subjecting a restricted portion of said tape member to a high concentration of evaporating metal at temperatures above the melting point of said tape member while moving the tape through said chamber at a rapid pace to prevent melting thereof, chemically stabilizing said tape member during cooling thereof and coating said conductive layer with a thermoplastic layer from a capillary flow-supplied meniscus.

3. A continuous process for providing a flexible, optically-transparent thermoplastic recording tape which includes evaporating an electrical conducting metal coating on said tape comprising:

(a) continuously passing said tape through an evacuation chamber,
(b) exposing said tape in said chamber to high temperature metal evaporation at a temperature substantially higher than the melting point of said tape,
(c) restricting the exposure of said tape to limited predetermined area,
(d) passing said tape through said chamber at a velocity sufficient to prevent melting thereof,
(e) thereafter passing said tape through a stabilizing process comprising,
(f) subjecting said tape during cooling thereof to a flow of clean air,
(g) coating said tape with a thin layer of a thermoplastic medium, and
(h) thereafter winding and storing said tape.

4. The invention as recited in claim 3 where said metal is chromium.

5. A method for producing a flexible, optically-transparent thermoplastic information recording tape comprising in sequence the steps of:

(a) neutralizing charged particles on the surface of said tape by means of an air ionizer,
(b) directing an air blast against the neutralized surfact of said tape for removing particles therefrom,
(c) cleaning said tape in a solvent to remove low molecular weight surface matter from the surface thereof,
(d) devolatilizing said tape to remove water and residual volatiles,
(e) coating one side of said tape with a thin electrically conducting metallic layer by vacuum evaporation at high temperature,
(f) stabilizing said tape during the cooling thereof by exposing the tape to a flow of clean dry air,
(g) applying a layer of thermoplastic medium over said electrically conducting layer by means of a capillary-fed meniscus coater,
(h) drying said tape in heated air, and
(i) winding said tape on a roll.

6. A coating apparatus comprising in combination, a feeding head, drive means adjacent said feeding head for moving a web to be coated past said feeding head spaced therefrom at least a finite distance, a closed reservoir for containing liquid coating solution, said reservoir having said feeding head projecting from the outer surface thereof, upwardly-directed capillary means in said feeding head interconnecting the interior of said reservoir with at least one outlet from said feeding head located adjacent said drive means, means separate from said capillary means connected to said reservoir for recirculating liquid coating solution to and from said reservoir, said recirculating means being connected as a substantially closed system to maintain a supply of coating solution at a predetermined level in said reservoir, said predetermined level being below the elevation of said outlet, said capillary means placing said outlet and the interior of said reservoir in flow communication whereby when coating solution is present in said reservoir to said predetermined level capillary flow therebetween is provided to establish and maintain a meniscus between said web and said feeding head.

7. The invention as recited in claim 6 wherein the means for recirculating includes a closed vented storage vessel, means for heating the coating solution present in said storage vessel and heat exchange means for cooling the coating solution prior to the circulation thereof to the reservoir.

8. An integral coating head for providing a smooth uniform coating on an information recording medium by establishing and maintaining a meniscus of coating solution between the coating head and the recording medium during relative motion without physical contact therebetween, comprising in combination a closed housing for containing a supply of liquid coating solution therein, inlet and exit means in said housing providing for the circulation of coating solution through said housing to maintain said supply at a predetermined level, a feeding head projecting from the outer surface of said housing adjacent the recording medium, said feeding head having an outer face with at least one opening therein, a capillary passage extending upwardly in said feeding head interconnecting the interior of said housing with said opening in said feeding head for replenishing said meniscus with coating solution, said opening always being at a higher elevation than said predetermined level, and means connected to said housing for angularly adjusting the position of said outer face of said feeding head relative to the recording medium.

9. A coating apparatus comprising in combination, a feeding head, drive means adjacent said feeding head for moving a web to be coated past said feeding head spaced therefrom at least a finite distance, a closed reservoir for containing liquid coating solution, said reservoir having said feeding head projecting from the outer surface thereof, upwardly-directed capillary means in said feeding head interconnecting the interior of said reservoir with at least one outlet from said feeding head located adjacent said drive means, means separate from said capillary means connected to said reservoir for recirculating liquid coating solution to and from said reservoir, said recirculating means being connected as a substantially closed system to maintain a supply of coating solution at a predetermined level in said reservoir, said predetermined level being below the elevation of said outlet, said capillary means placing said outlet and the interior of said reservoir in flow communication whereby when coating solution is present in said reservoir to said predetermined level capillary flow therebetween is provided to establish and maintain a meniscus between said web and said feeding head, and means connected to said reservoir for angularly adjusting the position of said feeding head relative to said web.

References Cited by the Examiner

UNITED STATES PATENTS

| | | | |
|---|---|---|---|
| 1,929,877 | 10/33 | Bonamico | 118—401 |
| 2,046,596 | 7/36 | Zwiebel | 118—401 |
| 2,405,662 | 8/46 | McManus et al. | 117—107.1 |
| 2,971,862 | 2/61 | Baer et al. | 117—107.1 |
| 3,063,868 | 11/62 | Brandsma et al. | 118—410 |
| 3,063,872 | 11/62 | Boldebuck | 117—218 |

FOREIGN PATENTS

| | | |
|---|---|---|
| 701,790 | 1/54 | Great Britain. |

RICHARD D. NEVIUS, *Primary Examiner.*